United States Patent [19]
Oertli

[11] Patent Number: 5,370,157
[45] Date of Patent: Dec. 6, 1994

[54] RELEASABLE HEALD ROD TO HEALD FRAME FASTENER

[75] Inventor: Gustav Oertli, Brütten, Switzerland

[73] Assignee: Sulzer Rüti AG, Rueti, Switzerland

[21] Appl. No.: 121,383

[22] Filed: Sep. 14, 1993

[30] Foreign Application Priority Data

Nov. 13, 1992 [EP] European Pat. Off. ........ 92810886.9

[51] Int. Cl.$^5$ .......................... D03C 9/00; D03C 1/14
[52] U.S. Cl. ........................................ 139/82; 139/57;
139/88; 139/91; 403/362
[58] Field of Search ........................ 403/362, 376, 106;
24/514, 569; 139/82, 57, 88, 91

[56] References Cited

U.S. PATENT DOCUMENTS

| | | | |
|---|---|---|---|
| 1,262,425 | 4/1918 | Young | 403/362 |
| 4,116,573 | 9/1978 | Fuchs | 403/362 X |
| 4,998,841 | 3/1991 | Wilde | 403/362 X |

FOREIGN PATENT DOCUMENTS

| | | |
|---|---|---|
| 0329443 | 8/1989 | European Pat. Off. . |
| 3536868A1 | 4/1986 | Germany . |
| 3-22294 | 9/1989 | Japan . |
| 345446 | 3/1931 | United Kingdom .................. 139/91 |

Primary Examiner—Andrew M. Falik
Attorney, Agent, or Firm—Townsend and Townsend Khourie and Crew

[57] ABSTRACT

An arrangement for releasably fastening an elongate first member (1), such as a heald rod in a loom, within a second member (2), such as a coupling element between the heald rod and a shaft drive. The second member includes a first recess (4a) forming a cavity (4) and a second recess (4b) for receiving the first member. A fastener (3) is threadably coupled to the second member within a third recess (4c). The fastener engages the first member at a bearing point (5) within the cavity to fix the first and second members together. This engagement bends the first member within the cavity so that relative movement between the two members is reduced or eliminated.

16 Claims, 2 Drawing Sheets

RELEASABLE HEALD ROD TO HEALD FRAME FASTENER

BACKGROUND OF THE INVENTION

The present invention is concerned with an arrangement in for fastening two members in a releasable manner as well as a heald rod with such an arrangement and a loom having a heald rod of that kind.

SUMMARY OF THE INVENTION

In the Japanese Utility Model No. 22294/91 an arrangement is disclosed for connecting a heald rod to a heald drive. The heald rod comprises a square tube connected to the bellcrank and a rod arranged in the square tube, which is fastened to the square tube by means of two screws and a clamp body. The rod lies between one inner face of the square tube and one surface of the clamp body and is fastened frictionally by means of the clamping action generated by the screws.

The aim of the invention is to create an arrangement for the detachable fastening of a first member to a second member which admits the first member, by means of a fastener provided in the second member, in which because of the inherent elasticity of the first member a higher frictional force is achieved, whereas this arrangement shows a simple construction and application.

The advantage achievable by the invention is to be seen essentially in that the connection generated exhibits at least three areas of contact.

The advantage of this heald rod consists in that because of the rod being elastic in bending a connection arises having five areas of contact, so that the force of friction is further increased.

The advantage thereby achievable is essentially to be seen in that a simple and secure connection is achieved between the heald rod and the heald drive or respectively the heald. The heald rod my be separated and connected in a very simple way, and the length of the heald rod is very simply adjustable. The connection is low in mass, very narrow in the form of its execution and easily accessible for work of adjustment. Because of the elastic properties of the heald rods in bending, relative movements between the heald drive and the heald my be taken into account without additional hinged connections being necessary.

BRIEF DESCRIPTION OF DRAWINGS

The invention is explained below with the aid of the attached drawings. There is shown in.

DESCRIPTION OF THE PREFERRED EMBODIMENT

Figure 1:
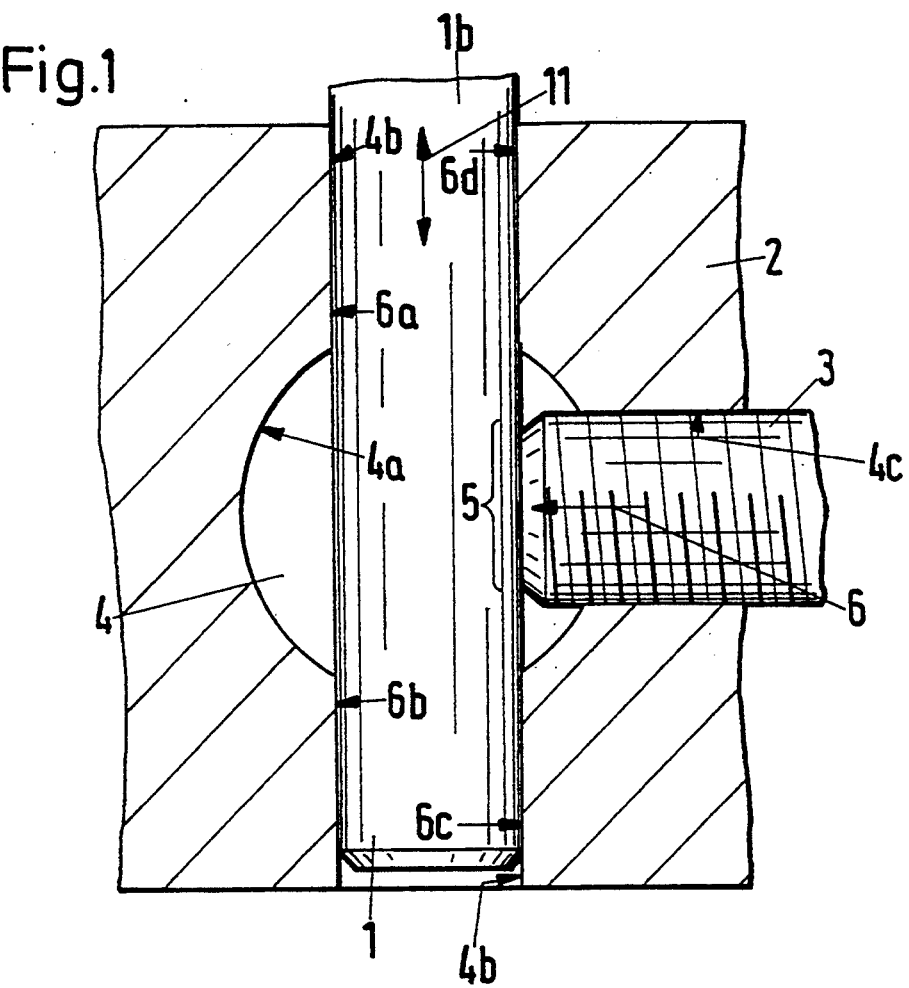
FIG. 1—a section through an embodiment of an arrangement in accordance with the invention.

FIG. 1 shows an arrangement for the detachable fastening of a first member 1 made in the present embodiment as a rod 1b, for example, as a cylindrical rod 1b, to a second member 2. The rod 1b may also exhibit other shapes of cross section such, for example, as oval or polygonal, in particular square. A first recess 4a forms in the second member 2 a cavity 4 with a contour from the group: spherical, cylindrical, cubical or polyhedral or portions of these. For admitting the rod 1b the second member 2 exhibits a second recess 4b which opens into the cavity 4 at opposite places, the second recess 4b exhibiting a cross-sectional shape from the group: round, oval or polygonal, and the cross-sectional shape of the recess 4b usually corresponding with the cross-sectional shape of the first member 1 or respectively the rod 1b. In the present embodiment the first recess 4a and the second recess 4b are made in the form of hollow cylinders and so arranged that their axes cross and run centrally The recesses 4a and 4b are arranged running mutually centrally, though they naturally may also be arranged running mutually offcentre.

In the loosened state the rod 1b may be moved to and fro in the second member 2 in the direction of motion 11 though between the recess 4b and the rod 1b, that is to say, transversely to the direction of motion 11, there exists little play. A further recess 4c running perpendicular to the recess 4b is let into the second member 2) for a detachable fastener 3 directed at right angles to the rod 1b, which may be made, for example, as a screw 3a. The fastener 3 comes via the bearing point 5 into operative connection with the rod 1b so that a force 6 from the fastener 3 is introduced against the rod 1b. With a rigid rod 1b the force 6 introduced is transmitted via the forces 6a and 6b essentially via two contact areas to the second member 2. In the case of a rod 1b elastic in bending the force 6 introduced causes essentially four forces 6a, 6b, 6c, 6d, which are transmitted to the second member 2. Hence a connection arises between the rod 1b, the second member 2 and the fastener 3 having at least three or respectively five contact areas, which brings about a high frictional force in the direction of motion 11.

The force 6 may naturally also be introduced into the first member 1 acting in the opposite direction, by the fastener 3 exhibiting, for example, in the region of the cavity 4, a recess which surrounds the first member 1. In that case the fastener 3 effects a tension upon the first member 1. Fastener 3 bends first member 1 so that first member 1 is resiliently deflected into cavity 4. In this embodiment the fastener 3 consists of at least two parts, for example, one part with a recess for admitting the member 1 and having a thread, as well as the second part, a nut which, resting against the surface of the second member 2, makes the tension possible.

Figure 2:
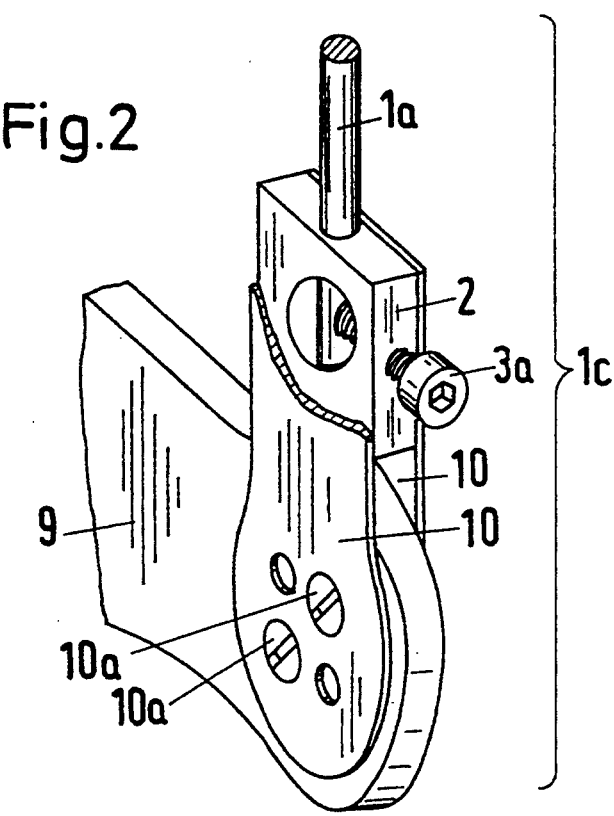
FIG. 2—a perspective of one part of an embodiment of a heald rod in accordance with the invention with the arrangement in accordance with FIG. 1.

FIG. 2 shows a heald rod 1c for the up and down movement of a heald 7 of a loom with an arrangement for fastening the cylindrical rod 1a detachably to a second member 2 by means of a screw 3a. Two coupling members 10 are connected to the second member 2, the coupling members 10 being connected at their opposite ends to a heald drive 9 by means of detachable means 10a of connection so as to be pivotable via a bearing part which is not visible. The rod 1a, the second member 2 with the screw 3a as well as the pair of coupling members 10 are component parts of the heald rod 1c. The employment of a rod 1a elastic in bending makes possible a heald rod 1c by which relatively large forces may be transmitted to the heald 7 in the direction of motion 11.

Figure 3:
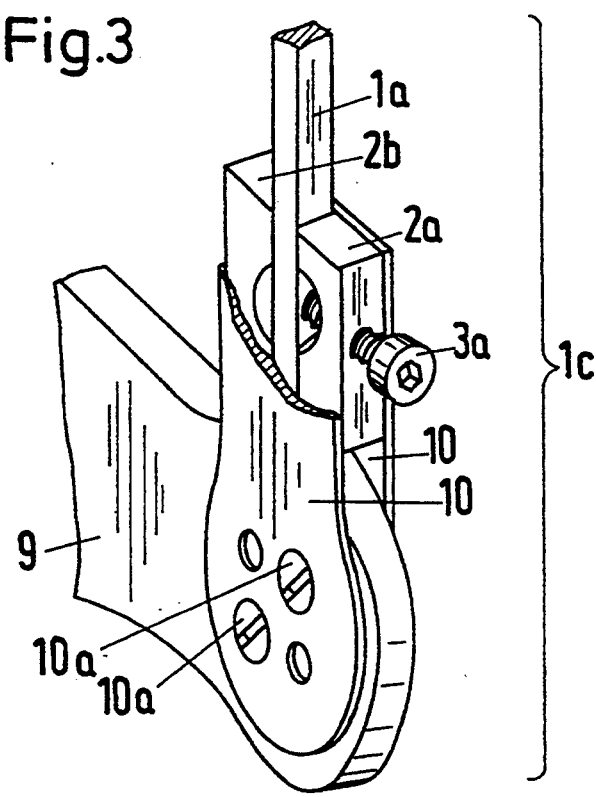
FIG. 3—a perspective of a modified embodiment in accordance with FIG. 2.

FIG. 3 shows a further embodiment of a heald rod 1c with a rectangular rod 1a, where the width of the rod 1a corresponds approximately with the width of the second member, so that the second member is divided into two spaced part members 2a, 2b which are connected firmly together through the pair of coupling members 10. The pair of coupling members are again connected to a heald drive 9 by means of detachable means 10a of connection so as to be pivotable via a bearing part which is not visible.

Figure 4:
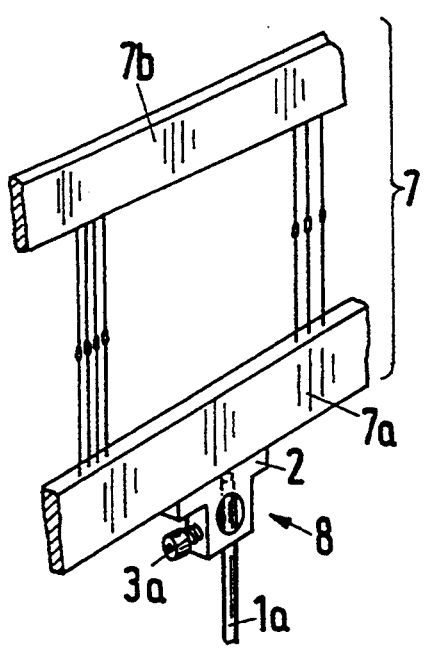
FIG. 4—a perspective of one part of a first embodiment of a loom having the arrangement in accordance with FIG. 1.

FIG. 4 shows the heald 7 of a loom, having a lower frame part 7a and an upper frame part 7b. The rod 1a forming one component part of the heald rod 1c is connected via a coupling part 8 to the lower frame part 7a. The coupling part 8 may be executed in very different styles. In the embodiment represented the coupling part 8 consists also of a second member 2 with a screw 3a as fastener. By the members 2 with fastener 3 lying at one or both ends of the heald rod 1c the heald 7 is detachable in a simple way from the heald drive 9 The absolute length of the heald rod 1c and hence the position of a heald 7 may be altered in an equally simple way by the members 2 with fastener 3. The elastic properties of the rod 1a allow mutual relative movements of the two second members 2, or respectively relative movements between the heald drive 9 and the heald 7, so that even in the case of quite large relative movements hinged parts may be waived.

Figure 5:
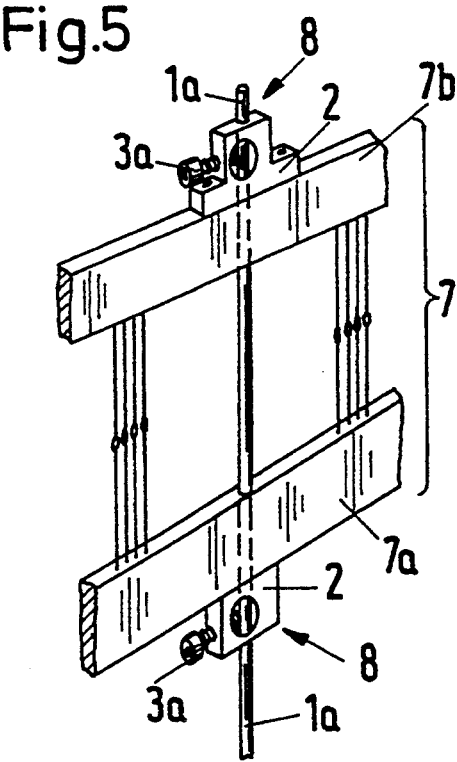
FIG. 5—a perspective of a second embodiment of a loom with arrangements in accordance with FIG. 1.

FIG. 5 shows a further heald 7 from a loom. The rod 1a forming one component part of the heald rod 1c is prolonged beyond the upper frame part 7b. Two coupling parts 8 are arranged on the rod 1a in such a way that the heald 7 comes to lie between the two coupling parts 8 and is in operative connection with them. Each coupling part 8 is again executed as a second member 2 with a screw 3a as fastener 3. The coupling parts 8 may be firmly connected to the lower frame part 7a or to the upper frame part 7b or even act only in a loose operative connection upon the heald 7. Thus, for example, the coupling part 8 in operative connection with the lower frame part 7a serves in an advantageous embodiment to establish the height of the heald 7 with respect to the rod 1a. In that case no direct connection exists between this coupling part 8 and the lower frame part 7a. In this embodiment a coupling part 8 is connected directly to the upper frame part 7b. Upon exchanging a heald 7 only the coupling part 8 connected to the upper frame part 7b has to be loosened from the rod 1a. The coupling part 8 acting upon the lower frame part 7a remains connected firmly to the rod 1a and defines the height of the newly inserted heald 7 with respect to the rod 1a.

I claim:

1. A releasable, low mass fastening arrangement comprising:
    an elongated, relatively elastic first member subjected to relatively large, longitudinally acting operating forces;
    a second, relatively rigid member including an elongated recess receiving a section of the first member therein and including a cavity located between ends of the recess and arranged so that a portion of the section of the first member extends across the cavity; and
    a fastener engaging the second member and movable relative thereto into engagement with the portion of the first member, the fastener and the second member being configured so that the fastener applies a force to the member which resiliently deflects the portion into the cavity to thereby substantially immovably secure the first and second members to each other so that the operating forces can be transferred between the members.

2. An arrangement as in claim 1 wherein the fastener is positioned so that engagement between the fastener and the first member directs a force at a right angle to the first member.

3. An arrangement as in claim 1 wherein the first recess has a contour selected from the group consisting of spherical, cylindrical, cubical and polyhedral.

4. An arrangement as in claim 1 wherein the second member further includes a second recess extending through the cavity of the second member and sized to admit the first member.

5. An arrangement as in claim 4 wherein the second recess has a cross-sectional shape selected from the group consisting of round, oval and polygonal.

6. A releasable, low mass fastening arrangement comprising:
    an elongated, relatively elastic first member subjected to relatively large, longitudinally acting operating forces;
    a second, relatively rigid member including an elongated hole receiving a section of the first member therein and including a cavity located between ends of the hole and arranged so that a portion of the section of the first member extends across the cavity; and
    a fastener engaging the second member and movable relative thereto into engagement with the portion of the first member, the fastener and the second member being configured so that the fastener applies a force to the member which resiliently deflects the portion into the cavity to generate pairs of oppositely directed reactive forces in the hole on each side of the cavity to thereby substantially immovably secure the first and second members to each other so that the operating forces can be transferred between the members.

7. A releasable, low mass fastening arrangement comprising:
    an elongated, relatively elastic first member subjected to relatively large, longitudinally acting operating forces and having, in cross-section, a width;
    a second, relatively rigid member including first and second aligned holes, a section of the first member being disposed in the holes, a cavity located between the holes and arranged so that a portion of the section of the first member extends across the cavity, each hole having a length at least as long as the width of the first member; and
    a fastener engaging the second member and movable relative thereto into engagement with the portion of the first member, the fastener and the second member being configured so that the fastener applies a force to the member which resiliently deflects the portion into the cavity to thereby substantially immovably secure the first and second members to each other so that the operating forces can be transferred between the members.

8. An arrangement for releasably fastening a first member within a second member comprising:
    a fastener movably mounted to the second member;
    the second member having a first recess forming a cavity, the cavity surrounding a portion of the first member, the fastener configured to engage the first member at a bearing point within the cavity; and the second member having a second recess extending through the cavity and sized to admit the first member, the second recess being arranged offcenter with respect to the first recess.

9. An arrangement for releasably fastening a first member within a second member comprising:
   a fastener movably mounted to the second member;
   the second member having a first recess forming a cavity, the cavity surrounding a portion of the first member, the fastener configured to engage the first member at a bearing point within the cavity; and
   the second member having a second recess extending through the cavity and sized to admit the first member, the first recess and the second recess being hollow cylinders with intersecting axes.

10. An arrangement for releasably fastening a first member within a second member comprising:
    a fastener movably mounted to the second member;
    the second member having a first recess forming a cavity, the cavity surrounding a portion of the first member, the fastener configured to engage the first member at a bearing point within the cavity; and
    the second member having a second recess extending through the cavity and sized to admit the first member; and
    the first member being sized to fit tightly against a wall of the second recess.

11. An arrangement as in claim 10 wherein the first member is a rod and the fastener is a screw.

12. A drive for reciprocating a heald, the drive comprising:
    a first coupling member pivotally coupled to the drive;
    a second coupling member fixed to the first coupling member, the second coupling member having a recess forming a cavity;
    an elastic rod releasably connected to the second coupling member, the cavity surrounding a portion of the elastic rod; and
    a fastener movably mounted to the second member, the fastener configured to engage and bend the elastic rod at a bearing point within the cavity.

13. An arrangement as in claim 12 wherein the rod has a longitudinal axis and a length along the axis, the second coupling member having a dimension in the direction of the rod axis, the dimension of the second coupling member being substantially less than the length of the rod so that the rod can be easily decoupled from the second coupling member.

14. A loom having a plurality of healds and heald rods, each heald being releasably connected to a corresponding heald rod by a coupling device, the coupling device comprising:
    a coupling part fixed to each heald, the coupling part having a recess forming a cavity, the cavity surrounding a portion of the heald rod; and
    a fastener movably mounted within the coupling part, the fastener configured to engage the heald rod so that the rod bends within the cavity.

15. A loom as in claim 14 wherein each heald has a frame with an upper part and a lower part, the coupling part being fastened to the upper part of the frame of the heald.

16. A loom as in claim 15 further comprising a second coupling part fixed to the lower part of the frame of the heald and releasably connected to the heald rod.

* * * * *